United States Patent

[11] 3,627,571

| [72] | Inventors | Robert A. Cass;<br>Samuel Steingiser, both of Dayton, Ohio |
|---|---|---|
| [21] | Appl. No. | 41,481 |
| [22] | Filed | May 28, 1970 |
| [45] | Patented | Dec. 14, 1971 |
| [73] | Assignee | Monsanto Research Corporation<br>St. Louis, Mo. |

[54] HEAT TREATMENT OF GRAPHITE FIBERS
3 Claims, 1 Drawing Fig.

[52] U.S. Cl.................................................. 117/118,
23/209.2, 117/76 T, 117/169, 117/228, 117/DIG.
11, 264/29, 264/DIG. 19
[51] Int. Cl................................................. B44d 5/12
[50] Field of Search............................................ 117/118,
169, DIG. 11, 46 CC, 228, 76 T, 76 R; 23/209.1 P,
209.2; 8/115.6; 264/DIG. 19, 29

[56] References Cited
UNITED STATES PATENTS

| 3,549,408 | 12/1970 | Bonne et al................... | 117/169 X |
| 3,427,120 | 2/1969 | Shindo et al.................. | 117/46 CC X |
| 3,357,929 | 12/1967 | Olstowski...................... | 264/29 X |
| 3,333,926 | 8/1967 | Moyer, Jr. et al............ | 23/209.4 X |
| 3,281,261 | 10/1966 | Lynch ........................... | 117/46 CC |
| 2,978,358 | 4/1961 | Campbell...................... | 117/DIG. 11 |
| 2,615,932 | 10/1952 | Marko et al. ................. | 117/DIG. 11 |

*Primary Examiner*—Alfred L. Leavitt
*Assistant Examiner*—Kenneth P. Glynn
*Attorneys*—Morris L. Nielsen, L. Bruce Stevens, Jr. and Frank D. Shearin

ABSTRACT: A process for improving the shear strength of a graphite fiber-resin matrix composite wherein the fibers are coated with a catalyst and are heat-treated in a halogen-containing atmosphere at a temperature above 300°C.; such composites being useful as structural materials.

PATENTED DEC 14 1971
3,627,571
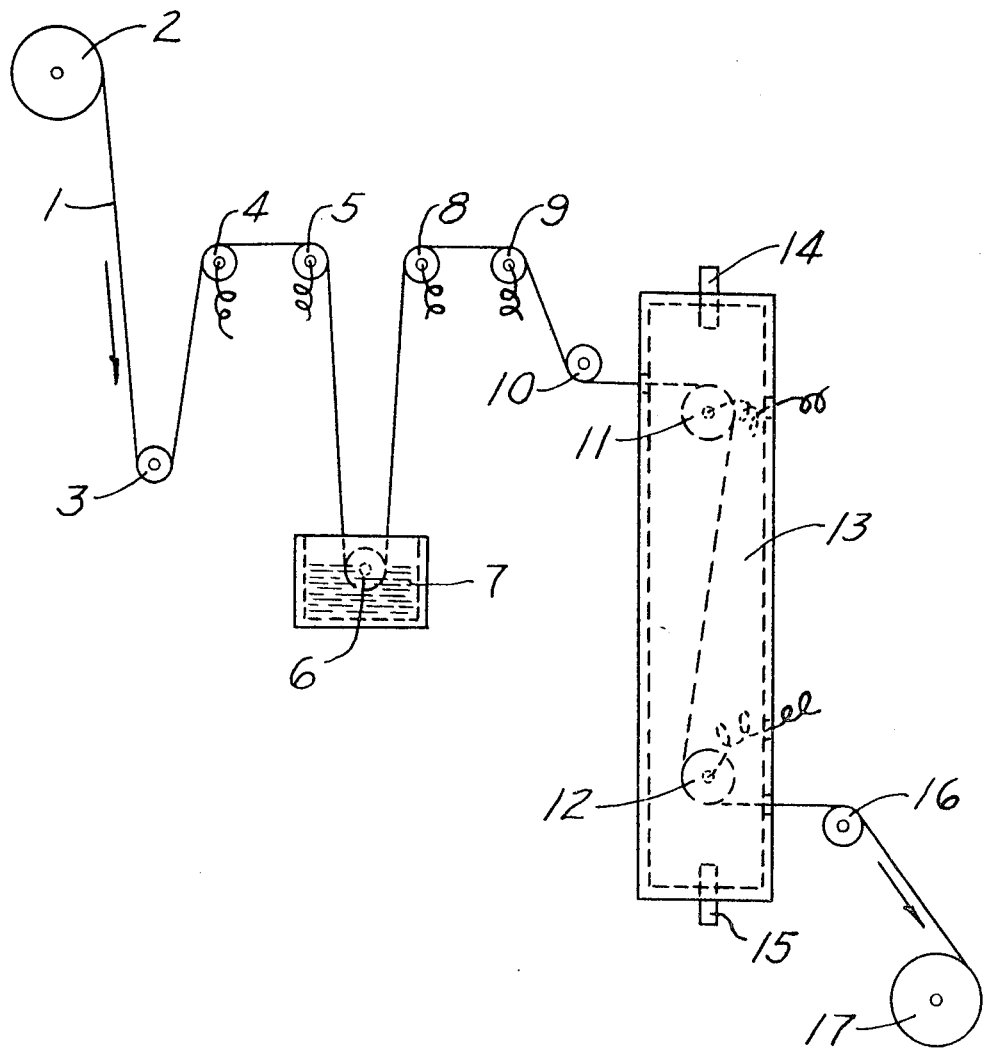
INVENTORS.
ROBERT A. CASS
SAMUEL STEINGISER
BY
Morris L. Nielsen
ATTORNEY.

HEAT TREATMENT OF GRAPHITE FIBERS

The invention described herein was made in the course of, or under, a contract with the Department of the Air Force.

BACKGROUND OF THE INVENTION

This invention pertains to a process for modifying fibers and more particularly to heat-treating graphite fibers in a halogen-containing atmosphere for the purpose of improving the shear strength of a graphite fiber-resin matrix composite.

Graphite fibers having high tensile strength, e.g. over 200,000 p.s.i., and high modulus, e.g. over $20 \times 10^6$ p.s.i., have recently become available in the market place. Composites made from such graphite fibers and resin matrices, including epoxy resins, phenolics, polyesters, polyimides, etc., are useful structural materials because of their high strength-to-weight ratio. However, such composites have generally not attained their anticipated potential because of deficiencies in interlaminar shear strength.

U.S. Pat. No. 3,333,926 issued Aug. 1, 1967 to Moyer et al. discloses a process for carbonizing cellulosic material in a halogen-containing atmosphere and subsequently graphitizing at above 800° C.

We have found that improved composite shear strengths are obtained by our process at much lower temperatures than 800° C., vis, about 300°–600° C., if the graphite fibers are coated with one or more catalyst materials.

SUMMARY OF THE INVENTION

An object of this invention is to provide a continuous process for modifying the surface of graphite fibers. Another object is to provide a process for improving the bonding between graphite fibers and a resin matrix. A further object is to provide a process for improving the shear strength of composites containing graphite fibers and a resin matrix. Still a further object is to provide a composition incorporating heat-treated graphite fibers as a reinforcement.

These and other objects hereinafter defined are met by the invention wherein there is provided a process of treating a high-modulus graphite fiber to improve the bonding characteristics of said fiber to a resin matrix comprising coating the fiber with about 0.001 to 1.0 percent by weight of a catalyst consisting of halides of aluminum or iron and heating the coated fiber in an atmosphere containing at least about 5 percent of a halogen gas at a temperature above 400° C. for a time sufficient to improve the shear strength of a graphite fiber-resin matrix composite over the shear strength of a control composite made with untreated graphite fibers.

The invention is adaptable and applicable to graphite fibers not only in the form of tow but also in yarns, tapes, felts, sheets, woven fabrics and other forms prepared from or containing graphite fibers. Although the term "graphite" is used, the fibers need not be highly crystalline as determined by X-ray diffraction analysis.

The invention may be practiced as a batch operation, but for a full-scale industrial process it is preferably done continuously. Yarns provide an especially convenient form for a continuous process.

The catalysts are metal halides of the metals: aluminum, iron, beryllium, calcium, cadmium, zinc, copper, boron, cerium, gallium, vanadium, titanium, zirconium, tin, niobium, tantalum, antimony, bismuth, cobalt, nickel and uranium. The catalyst is dissolved in a solvent, usually water. The solution may contain added hydrohalogen acid, e.g. HCl, to prevent solvolysis and precipitation. Preferred catalysts are aluminum chloride and ferric chloride. They may be applied from solutions containing from 100 p.p.m. up to several percent by weight of catalyst.

The heating means may be by any conventional source of heat including: combustion of hydrocarbons or oxidizable gases or liquids; radiant heating, e.g. from electrically heated resistance wires or bars; inductive heating, e.g. by direct coupling of radiofrequency energy to the heated work object or indirectly by radiation from a susceptor; microwave or dielectric heating; arc plasma; laser or maser heating; etc. We have found, for the purposes of this invention, that the preferred method of heating graphite fibers and yarn is by passing an electric current through the material thereby providing heat from the natural resistance of the material to the flow of electricity. This method of heating is preferred not only for its convenience, speed and efficiency but also because it yields a superior product by its reproducibility and ease of control.

The halogen-containing atmosphere may consist of a mixture of halogen and a nonoxidizing gas such as nitrogen, argon, or helium. Of the halogen gases, chlorine is preferred. The halogen content may range from at least about 5 percent to 100 percent.

For a given halogen content and dwell time, an increase in the heat-treating temperature above 200° C. generally results in an increase in the shear strength of the resulting composite. However, above a certain optimum temperature determined by experimentation there may occur a decrease in the fiber strength of the composites.

For optimum shear strength, there exists an interrelationship between the halogen content of the atmosphere, the dwell time and the fiber temperature. As the temperature and the halogen content are increased, the sojourn or dwell time is decreased. Within the range of about 300°–600° C. and about 5–100 percent of chlorine, we have found that the preferred dwell time will generally be within the range of about 7 to 60 seconds. The dwell time for obtaining shear strength improvement is readily determined by experimentation as hereafter set forth. Furthermore, the heat-treating conditions are preferably optimized in view of both shear and tensile strength.

For purposes of process control, e.g. in determining the dwell time, the improvement in bonding between the graphite fiber surface and a matrix resin is determined by an interlaminar shear test of a composite. The treated graphite fibers in yarn form are formed into a filament-wound composite with a suitable resin such as an epoxy. The composite is cured, and testing specimens are cut to a suitable size and shape, e.g. 0.08 in. $\times$ 0.13 in. $\times$ 0.52 in. Shear strength is determined by the short beam shear test ASTM D 2344-67-T (modified). The span/depth can be set at 3/1, 4/1 or 6/1 but is preferably 4/1. A discussion of the test and the effect of span/depth is published by Steingiser, Samuel and Cass, Robert A., "Graphite Fiber Reinforced Composites," AFML-TR-68-357, Part I, Nov. 1968, pages 84, 96–107.

The heat-treated fibers of this invention are useful for reinforcing resin matrix composites. Typical resins used in conjunction with graphite fibers are epoxies, polyesters, polyimides, phenolics, and furan resins. The composites are high-strength structural materials useful in aircraft components.

BRIEF DESCRIPTION OF THE DRAWING

Some of the novel features of the present invention will become apparent from the following description which is to be considered in connection with the accompanying drawing.

The drawing is a representation of a continuous process for treating graphite yarn. The graphite yarn 1 is unwound from supply reel 2 which is turned by an unreeling motor controlled by "dancer" 3. The dancer consists of a pulley which floats on the graphite yarn and operates a microswitch. As downstream tension develops on the yarn, the dancer moves upward and starts the unreeling motor to supply more yarn and thereby maintain a predetermined tension, e.g. 10–100 grams. The yarn passes over pulleys 4, 5, 6, 8, 9, 10, 11, 12 and 16, thence to drum 17. The yarn is heated in three separate stages: (A) between electroconducting pulleys 4 and 5 by an electric current to remove sizing and foreign matter; (B) between electroconducting pulleys 8 and 9 to remove solvent and to dry the yarn; and (C) between electroconducting pulleys 11 and 12 to obtain the necessary heat-treating temperature in a halogen atmosphere. Between stage A and B the yarn passes over pulley 6 in pan 7 containing a solution of the catalyst, e.g. ferric chloride in water and hydrochloric acid. Pulleys 11 and 12 are contained within chamber 13 provided with ports 14 and 15 for entry and exit of halogen gas.

DESCRIPTION OF THE PREFERRED EMBODIMENTS

The invention is further illustrated by, but not limited to, the following examples.

EXAMPLE 1

This example illustrates heat-treatment of graphite yarn in a chlorine atmosphere, using a coating of ferric chloride on the yarn.

The movement of the yarn is shown schematically in the drawing. Graphite yarn 1 was passed over electroconducting pulleys 4 and 5 and thereby heated electrically to about 350° C. with a current of 0.4 amp., with a dwell time of about 12 seconds in air, to remove sizing and other foreign matter; thence over pulley 6 in pan 7 containing ferric chloride solution (about 0.1 percent by weight in water containing about 6 percent by weight HCl); thence over electroconducting pulleys 8 and 9 for heating to about 150°–200° C. with a current of 0.2 amp., with a dwell time of about 12 seconds in air, to dry; thence through chamber 13 provided with ports 14 and 15 for entry and exit of chlorine, passing over electroconducting pulleys 11 and 12 for heating to any desired temperature within the range 25°–750° C. by means of an electric current, with a dwell time of about 30 seconds.

The tensile strength of the treated yarn was determined on a strand (about 1440 filaments). The yarn was placed on a frame and impregnated with an epoxy resin (e.g. Union Carbide's ERL-2256/ZZL-0820), then cured at 150° C. for 15 minutes. The amount of resin on the yarn was about 50 percent by weight. The coated yarn was held in rubber faced jaws in the testing machine, and a gage length of 1 inch was used for obtaining the yarn tensile strength. The tensile strength ($S_t$) was calculated from the formula $$S_t = \frac{\text{Breaking load (lbs.)} \times \text{Specific gravity (lbs./cu. in.)}}{\text{Weight of yarn, lb./in. length}}$$

The effect of the treatment on the shear strength of a composite was determined as follows. The treated graphite fibers in yarn form were formed into a filament-wound composite with an epoxy resin. For this purpose, the resin was 100 parts by weight of (a) a mixture of a cycloaliphatic epoxide and a bisphenol-A based epoxide, e.g. Union Carbide's ERL-2256 described in their Product Standards dated Nov. 1, 1964 and 27 parts by weight of (b) a diamine hardener, specifically a eutectic of methylene dianiline and m-phenylenediamine, e.g. Union Carbide's ZZL-0820.

The yarn was impregnated and then wound into a glass mold. This consisted basically of three pieces of glass, an inner rectangular form and two outer end pieces, held together by clamps. As the assembly was rotated in its plane, the filament winding was confined between the end pieces and assumed the thickness and shape of the inner form, e.g. 0.070 in. in thickness. A width of about 0.10 in. was obtained by winding 70 turns of yarn. After the composite was wound, it was freed of excess resin and cured, e.g. 2 hours at 80° C., 4 hours at 150° C. at 100 p.s.i. Testing specimens were cut to a suitable size and shape, e.g. 0.08 in. × 0.13 in. × 0.52 in. Shear strength was determined by the short beam shear test ASTM D 2344-67-4/1. A discussion of the test and the effect of span/depth is published by Steingiser, Samuel and Cass, Robert A., "Graphite Fiber Reinforced Composites," AFML-TR-68-357, Part I, Nov. 1968, pages 84, 96–107.

Results of heat-treatment of Thornel 50 in chlorine at various yarn temperatures as shown by fiber and composite properties are summarized in the table (dwell time about 30 sec.).

| Temp. °C. | Fiber Property Tensile Strength kp.s.i. | Composite Property Shear Strength, max. p.s.i. |
| --- | --- | --- |
| 100 | 260 | 5800 |
| 200 | 269 | 5600 |
| 300 | 275 | 5800 |
| 400 | 282 | 7100 |
| 500 | 279 | 9100 |
| 600 | 186 | 9500 |
| 700 | 131 | 8800 |
| Control (unheated) | 238 | 5000 |

Analysis of a typical treated fiber showed 0.2 percent Fe and 0.014 percent Cl by weight.

It is evident that treatment of the fibers at above 300° C. improved shear strength of a composite formed from the fibers over that of a control.

EXAMPLE 2

This example illustrates a treatment using a coating of aluminum chloride.

The method of example 1 was used except that pan 7 contained a solution of aluminum chloride (about 0.008 percent by weight in water containing about 7 percent by weight HCl).

Results of heat-treatment of Thornel 50 in chlorine at various yarn temperatures as shown by fiber and composite properties are summarized in the table.

| Temp. °C. | Fiber Property Tensile Strength kp.s.i. | Composite Property Shear Strength, max. p.s.i. |
| --- | --- | --- |
| 400 | 279 | 6200 |
| 500 | 238 | 9100 |
| 600 | 147 | 9400 |
| 700 | 237 | 8000 |
| Control (untreated) | 273 | 5100 |

It is evident that treatment of the fibers at 400°–700° C. improved the shear strength over that of a control.

What we claim is:

1. A process of treating a high-modulus graphite fiber to improve the bonding characteristics of said fiber to a resin matrix comprising
   a. coating the fiber with about 0.001 percent to 1.0 percent by weight of a catalyst consisting of halides of aluminum or iron and
   b. heating the coated fiber in an atmosphere containing at least about 5 percent of a halogen gas at a temperature above 300° C. for a time sufficient to improve the shear strength of a graphite fiber-resin matrix composite over the shear strength of a control composite made with untreated graphite fibers.

2. A process of claim 1 in which the catalyst consists of aluminum chloride or ferric chloride and the halogen is chlorine.

3. A process of claim 2 in which the temperature is from 300° to 600° C.

* * * * *